(12) United States Patent
Gopalakrishnan et al.

(10) Patent No.: US 9,280,572 B2
(45) Date of Patent: Mar. 8, 2016

(54) MANAGING PRODUCT INFORMATION VERSIONS

(75) Inventors: Prasanth Gopalakrishnan, Kerala (IN); Amanjit Singh Johal, Chandigarh (IN)

(73) Assignee: Oracle International Corporation, Redwood Shores, CA (US)

( * ) Notice: Subject to any disclaimer, the term of this patent is extended or adjusted under 35 U.S.C. 154(b) by 1164 days.

(21) Appl. No.: 12/352,237

(22) Filed: Jan. 12, 2009

(65) Prior Publication Data

US 2010/0185595 A1    Jul. 22, 2010

(51) Int. Cl.
*G06F 7/00* (2006.01)
*G06F 17/00* (2006.01)
*G06F 17/30* (2006.01)

(52) U.S. Cl.
CPC .................................. *G06F 17/30309* (2013.01)

(58) Field of Classification Search
None
See application file for complete search history.

(56) References Cited

U.S. PATENT DOCUMENTS

| | | | |
|---|---|---|---|
| 5,347,653 A * | 9/1994 | Flynn et al. ................... | 707/695 |
| 5,600,832 A | 2/1997 | Eisenberg et al. | |
| 5,950,210 A | 9/1999 | Nelson | |
| 6,457,021 B1 * | 9/2002 | Berkowitz et al. ......... | 707/999.2 |
| 6,560,601 B1 * | 5/2003 | Bjornerstedt .......... | 707/999.001 |
| 6,631,386 B1 | 10/2003 | Arun et al. | |
| 6,785,786 B1 * | 8/2004 | Gold .................... | G06F 11/1461 711/162 |
| 7,089,530 B1 * | 8/2006 | Dardinski et al. ............ | 717/105 |
| 7,953,945 B2 * | 5/2011 | Bender et al. ................. | 711/161 |
| 2006/0161598 A1 | 7/2006 | Barrs et al. | |
| 2007/0088766 A1 | 4/2007 | Bodge et al. | |
| 2007/0192715 A1 * | 8/2007 | Kataria et al. ................ | 715/764 |
| 2008/0208927 A1 * | 8/2008 | Chikusa et al. ............... | 707/203 |
| 2008/0228795 A1 * | 9/2008 | Lomet .......................... | 707/101 |
| 2011/0099543 A1 * | 4/2011 | Thorley et al. ................ | 717/168 |

OTHER PUBLICATIONS

TheServerSide.com, "Envers—Easy entity versioning with a single annotation", http://www.theserverside.com/news/thread.tss?thread_id=49190, Apr. 25, 2008.

(Continued)

*Primary Examiner* — Debbie Le
*Assistant Examiner* — Jau-Shya Meng
(74) *Attorney, Agent, or Firm* — Miles & Stockbridge PC (57) ABSTRACT

Systems and methods for managing versions of product attribute information are described. A database management system that manages a database for storing attribute information of a product is described. The database management system in this implementation comprises a version control system and a querying system. The version control system is configured to enable a user to insert one or more versions of product information in the database. Each version has an effective date and is divided into a plurality of attribute groups, each attribute group containing a plurality of attributes. One or more attribute groups are modified with respect to a previous version. The version control system is further configured to record which attributes of a modified attribute group are changed. The querying system is configured to enable a user to search the database based on the effective dates of the versions.

20 Claims, 8 Drawing Sheets

| Version | AG | Bit Map | a | b | c | d | Effective Date |
|---|---|---|---|---|---|---|---|
| 1.0 | AG1 | 1111 | 39.9 | 27.5 | 4.1 | 63.8 | 8/8/11 |
| | AG2 | 111 | TKS68A | plasma | 1800 | | |
| | AG3 | 111 | 1080i50 | 16:9 | 46 | | |
| 1.1 | AG1 | 1001 | 40.0 | 27.5 | 4.1 | 64.1 | 8/18/11 |
| 1.2 | AG2 | 001 | TKS68A | plasma | 1850 | | 8/19/11 |
| 2.0 | AG1 | 1111 | 40.2 | 27.8 | 3.9 | 64.7 | 9/9/11 |
| | AG3 | 101 | 1080p24 | 16:9 | 50 | | |
| 2.1 | AG3 | 001 | 1080p24 | 16:9 | 52 | | 9/21/11 |
| 3.0 | AG1 | 0011 | 40.2 | 27.8 | 3.7 | 64.5 | 10/24/11 |
| 4.0 | AG2 | 101 | TKS68B | plasma | 1950 | | 11/5/11 |
| 4.1 | AG1 | 1011 | 40.1 | 27.8 | 3.6 | 64.2 | 11/11/11 |
| 5.0 | AG1 | 0101 | 40.1 | 27.9 | 3.6 | 64.4 | 11/24/11 |
| | AG2 | 001 | TKS68B | plasma | 2100 | | |

(56) References Cited

OTHER PUBLICATIONS

Chatterjee, Ramkrishna et al., "Using Applications of Data Versioning in Database Application Development", Software Engineering, 2004, ICSE 2004, Proceedings of the 26$^{th}$ International Conference on Software Engineering, 2004.

Chatterjee, Ramkrishna et al., "Using Data Versioning in Database Application Development", Software Engineering, 2004, ICSE 2004, Proceedings of the 26$^{th}$ International Conference on Software Engineering, 2004.

* cited by examiner

| Version | Attribute 1 | Attribute 2 | Attribute 3 |
|---|---|---|---|
| V1 | A | B | C |
| V2 | A | D | E |
| V3 | F | D | E |
| V4 | F | D | G |

*FIG. 7A*

| Version | Attribute 1 | Attribute 2 | Attribute 3 |
|---|---|---|---|
| V1 | A | B | C |
| -- | -- | -- | -- |
| V3 | F | B | C |
| V4 | F | B | G |

*FIG. 7B*

| Version | Attribute 1 | Attribute 2 | Attribute 3 |
|---|---|---|---|
| V1 | A | B | C |
| V2 | A | D | E |
| V3 | A | F | E |

*FIG. 8A*

| Version | Attribute 1 | Attribute 2 | Attribute 3 |
|---|---|---|---|
| V1 | A | B | C |
| V1.1 | G | B | H |
| V2 | G | D | E |
| V3 | G | F | E |

*FIG. 8B*

Automobile
- AG1 = engine
  - a = size
  - b = type
  - c = cylinders
  - d = horsepower
- AG2 = dimensions
  - a = doors
  - b = seating capacity
  - c = length
  - d = width
  - e = weight
- AG3 = model information
  - a = make
  - b = model
  - c = style
  - d = year
- AG4 = features
  - a = fuel capacity
  - b = brakes
  - c = audio

FIG. 9

Television
- AG5 = dimensions
  - a = width
  - b = height
  - c = depth
  - d = weight
- AG6 = model information
  - a = model_ID
  - b = type
  - c = price
- AG7 = picture quality
  - a = resolution
  - b = aspect ratio
  - c = screen size

FIG. 10

| Version | AG | Bit Map | a | b | c | d | Effective Date |
|---|---|---|---|---|---|---|---|
| 1.0 | AG1 | 1111 | 39.9 | 27.5 | 4.1 | 63.8 | 8/8/11 |
|  | AG2 | 111 | TKS68A | plasma | 1800 |  |  |
|  | AG3 | 111 | 1080i50 | 16:9 | 46 |  |  |
| 1.1 | AG1 | 1001 | 40.0 | 27.5 | 4.1 | 64.1 | 8/18/11 |
| 1.2 | AG2 | 001 | TKS68A | plasma | 1850 |  | 8/19/11 |
| 2.0 | AG1 | 1111 | 40.2 | 27.8 | 3.9 | 64.7 | 9/9/11 |
|  | AG3 | 101 | 1080p24 | 16:9 | 50 |  |  |
| 2.1 | AG3 | 001 | 1080p24 | 16:9 | 52 |  | 9/21/11 |
| 3.0 | AG1 | 0011 | 40.2 | 27.8 | 3.7 | 64.5 | 10/24/11 |
| 4.0 | AG2 | 101 | TKS68B | plasma | 1950 |  | 11/5/11 |
| 4.1 | AG1 | 1011 | 40.1 | 27.8 | 3.6 | 64.2 | 11/11/11 |
| 5.0 | AG1 | 0101 | 40.1 | 27.9 | 3.6 | 64.4 | 11/24/11 |
|  | AG2 | 001 | TKS68B | plasma | 2100 |  |  |

*FIG. 11*

| Version | AG | Bit Map | a | b | c | d | Effective Date |
|---|---|---|---|---|---|---|---|
| 1.0 | AG1 | 1111 | 39.9 | 27.5 | 4.1 | 63.8 | 8/8/11 |
| | AG2 | 111 | TKS68A | plasma | 1800 | | |
| | AG3 | 111 | 1080i50 | 16:9 | 46 | | |
| 1.1 | AG1 | 1001 | 40.0 | 27.5 | 4.1 | 64.1 | 8/18/11 |
| 1.2 | AG2 | 001 | TKS68A | plasma | 1850 | | 8/19/11 |
| 2.0 | AG1 | 1111 | 40.2 | 27.8 | 3.9 | 64.7 | 9/9/11 |
| | AG3 | 101 | 1080p24 | 16:9 | 50 | | |
| 3.0 | AG1 | 0011 | 40.2 | 27.8 | 3.7 | 64.5 | 10/24/11 |
| 4.0 | AG2 | 101 | TKS68B | plasma | 1950 | | 11/5/11 |
| 4.1 | AG1 | 1011 | 40.1 | 27.8 | 3.6 | 64.2 | 11/11/11 |
| 5.0 | AG1 | 0101 | 40.1 | 27.9 | 3.6 | 64.4 | 11/24/11 |
| | AG2 | 001 | TKS68B | plasma | 2100 | | |

*FIG. 12*

| Version | AG | Bit Map | a | b | c | d | Effective Date |
|---|---|---|---|---|---|---|---|
| 1.0 | AG1 | 1111 | 39.9 | 27.5 | 4.1 | 63.8 | 8/8/11 |
|  | AG2 | 111 | TKS68A | plasma | 1800 |  |  |
|  | AG3 | 111 | 1080i50 | 16:9 | 46 |  |  |
| 1.1 | AG1 | 1001 | 40.0 | 27.5 | 4.1 | 64.1 | 8/18/11 |
| 1.2 | AG2 | 001 | TKS68A | plasma | 1850 |  | 8/19/11 |
| 2.0 | AG1 | 1111 | 40.2 | 27.8 | 3.9 | 64.7 | 9/9/11 |
|  | AG3 | 101 | 1080p24 | 16:9 | 50 |  |  |
| 3.0 | AG1 | 0011 | 40.2 | 27.8 | 3.7 | 64.5 | 10/24/11 |
| 3.1 | AG1 | 1001 | 40.4 | 27.8 | 3.7 | 64.9 | 10/30/11 |
| 4.0 | AG2 | 101 | TKS68B | plasma | 1950 |  | 11/5/11 |
| 4.1 | AG1 | 1011 | 40.1 | 27.8 | 3.6 | 64.2 | 11/11/11 |
| 5.0 | AG1 | 0101 | 40.1 | 27.9 | 3.6 | 64.4 | 11/24/11 |
|  | AG2 | 001 | TKS68B | plasma | 2100 |  |  |

*FIG. 13*

| Version | Attribute Group | Reference Version |
|---|---|---|
| 1.1 | AG1 | 1.0 |
| | AG2 | 1.0 |
| | AG3 | 1.0 |
| 1.2 | AG1 | 1.1 |
| | AG2 | 1.0 |
| | AG3 | 1.0 |
| 2.0 | AG1 | 1.1 |
| | AG2 | 1.2 |
| | AG3 | 1.0 |
| 3.0 | AG1 | 2.0 |
| | AG2 | 1.2 |
| | AG3 | 2.0 |
| 3.1 | AG1 | 3.0 |
| | AG2 | 1.2 |
| | AG3 | 2.0 |
| 4.0 | AG1 | 3.1 |
| | AG2 | 1.2 |
| | AG3 | 2.0 |
| 4.1 | AG1 | 3.1 |
| | AG2 | 4.0 |
| | AG3 | 2.0 |
| 5.0 | AG1 | 4.1 |
| | AG2 | 4.0 |
| | AG3 | 2.0 |

*FIG. 14*

| Version | AG | a | b | c | d | Reference Version |
|---|---|---|---|---|---|---|
| 4.0 | AG1 | 40.4 | 27.8 | 3.7 | 64.9 | 3.1 |
| | AG2 | TKS68B | plasma | 1950 | | 4.0 |
| | AG3 | 1080p24 | 16:9 | 50 | | 2.0 |

*FIG. 15*

MANAGING PRODUCT INFORMATION VERSIONS

TECHNICAL FIELD

The embodiments of the present disclosure generally relate to managing product information and more particularly relate to managing a series of different versions of the product information.

BACKGROUND

Manufactured products may include any number of attributes, features, specifications, characteristics, parameters, etc. Such attributes may include, for example, size, dimensions, weight, speed, power, output, fuel consumption estimation, model number, manufacturer information, capabilities, quality information, safety information, and so on, depending on the particular type of product being produced. These attributes are likely to change during the designing and manufacturing stages of a product. For instance, the designing stage of a product is usually an iterative process involving minor and sometimes major modifications to the product's design.

When the design of a product reaches a certain stage, the manufacturer can set a release date to indicate a future date when the product can be sold. The first release of a product is sometimes referred to a first version. Oftentimes, however, the design stage does not end with the setting of the first release date. Instead, the design can be tweaked or even changed drastically from the first version to create multiple versions having design modifications over a period of time. In this sense, many different versions of the product can be planned for release at various stages of the design and manufacture of the product.

Regarding the "versioning" of a product, or naming of versions, a scheme that was originally developed for software products can also be adapted for versioning many other types of products. One such versioning scheme includes defining a first version as "1.0." Thereafter, minor changes to the design can be given versions 1.1, 1.2, 1.3, and so on. Design changes to these minor changes can even be broken down further, such as 1.1.1, 1.1.2, 1.1.3, and so on. Major changes under this scheme can involve increasing the version numbers by greater amounts, such as 2.0, 3.0, 4.0, and so on. These and other schemes for describing versions of a product are known in the art. It should be noted that some versions may correspond to specific release dates. Alternatively, some versions can simply correspond to a design change that is to be released with a later version.

A database can be used to store each version of the product information. Instead of overwriting old data, each new version usually includes an additional copy of all the product's attributes for that version, even when only minor changes are made from one version to the next. Thus, the straight forward approach to versioning information is to duplicate an entire information snapshot for each version and then make the changes as needed.

SUMMARY

The present disclosure describes several embodiments of systems, methods, and software-based logic for managing a plurality of versions of product information. Regarding one of many implementations, a database management system that manages a database for storing attribute information of a product is described. This database management system comprises a version control system and a querying system. The version control system is configured to enable a user to insert one or more versions of product information in the database. Each version includes an effective date. Also, each version is divided into a plurality of attribute groups and each attribute group contains a plurality of attributes. One or more of the attribute groups are modified with respect to a previous version. The version control system is further configured to record which attributes of a modified attribute group are changed. The querying system is configured to enable a user to search the database based on the effective dates of the versions.

Other features, advantages, and implementations of the present disclosure, not expressly disclosed herein, will be apparent to one of ordinary skill in the art upon examination of the following detailed description and accompanying drawings. It is intended that such implied implementations of the present disclosure be included herein.

BRIEF DESCRIPTION OF THE DRAWINGS

The components of the following figures are illustrated to emphasize the general principles of the present disclosure. Reference characters designating corresponding components are repeated as necessary throughout the figures for the sake of consistency and clarity.

DETAILED DESCRIPTION

Each version representing the attribute data of a product typically includes an entire snapshot of all the product information for that version. Multiple versions of a product can be stored in a database and effectively managed using a database management system (DBMS). It is likely that several versions of a product are stored, although only certain information is changed from one version to another. Since the changes from one version to the next may include only minor modifications, storing the entire set of attributes for each version of a product can be wasteful of storage space. Because of the great amount of storage needed for such a technique, problems can arise when searching or querying such a large database. In fact, this type of system can restrict the user from storing a large number of versions in the database. Also, duplication of data across multiple versions makes it more difficult to trickle up the effects of versions that are inserted between or cancelled from among two subsequent versions, since the entire data must be copied and synchronized.

The embodiments of the present disclosure describe systems, methods, and logic configured to address these concerns and to manage a database that stores information regarding a product, object, entity, etc. Unlike a conventional DBMS, which typically manages data versions that are stored as entire snapshots of the relevant attributes of a product, the embodiments herein are configured to store only the portion of the product information that is changed from one version to another. In this way, if a product undergoes multiple version changes, the database is not filled with several versions having redundant information. Therefore, the management of this reduced amount of storage, as described herein, is based on storing only the changed information and referring back to portions of the data of previous versions if necessary to retrieve the relevant information for the respective version when needed.

According to the teaching of the present disclosure, a user is allowed to create a draft of a version and specify a planned effective date. Updates can be made to the draft as needed and are stored as delta data from the standpoint of a version having an existing planned effective date. The changes in the draft itself do not impact other released versions until the draft is approved, if applicable, and released. Until a version is actually released, the version is considered to float and does not alter the information stored with respect to the other versions. When released, the entire row of data that includes the changed data is stored. Rows of data that are not changed are not stored, but can be referenced from old versions.

A user can establish when a version is to be effective at a particular date in the future. When released, the data of a new version trickles up to apply the effects of the version on other versions. In some situations, one or more versions can be inserted in between other existing versions. Also, one or more versions can be cancelled, even versions located in between other existing versions. In the case where the user wishes to remove a version, the user can cancel the version and its effects will be removed from the later versions that rely upon that version. However, if necessary, the user can still refer to the cancelled version to the see the data, since the cancelled version can be stored in a separate storage unit.

Figure 1:
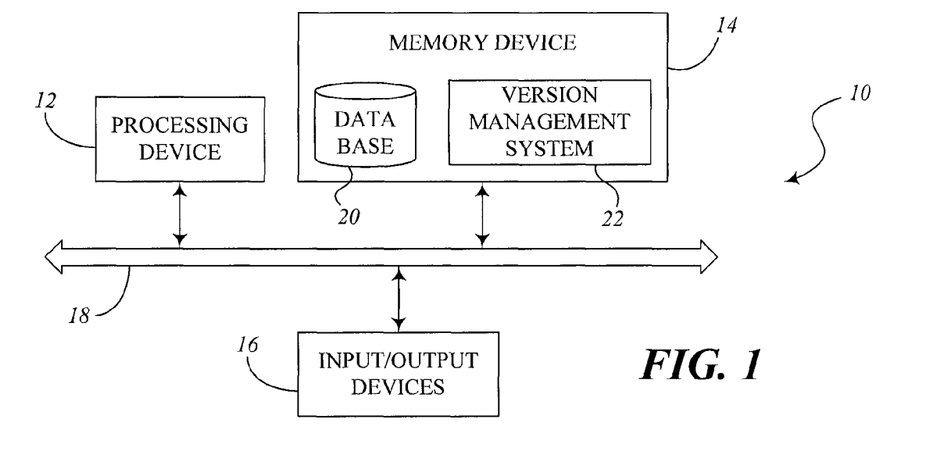
FIG. 1 is a block diagram illustrating a computing system according to one embodiment.

FIG. 1 is a block diagram of an embodiment of a computing system 10. Computing system 10 may represent any type of system that may be used within an organization, business, enterprise, government agency, department, group, etc. Particularly, computing system 10 may be a computer, data processing system, or other suitable electronic device for executing logic instructions, e.g., software applications. In some embodiments, computing system 10 is connected to a network associated with an organization. In the embodiment shown in FIG. 1, computing system 10 includes a processing device 12, a memory device 14, and input/output devices 16, each interconnected via a bus interface 18. Memory device 14 stores data, information, logic instructions, etc., in a database 20. Furthermore, memory device 14 includes, among other things, a version management system 22.

Processing device 12 may be a general-purpose or specific-purpose processor or microcontroller. Memory device 14 may include one or more internally fixed storage units, removable storage units, and/or remotely accessible storage units. The storage units can be configured to store information, data, instructions, and/or software code. The storage units may include any suitable combination of volatile memory, such as random access memory (RAM), dynamic RAM (DRAM), etc., and/or non-volatile memory, such as read only memory (ROM), electrically erasable programmable ROM (EEPROM), flash memory, etc.

Memory device 14 can also store program code that enables processing device 12 to execute database management procedures. Various logical instructions or commands may be included in the program code for managing database 20. The embodiments of version management system 22 described in the present disclosure can be implemented in hardware, software, firmware, or a combination thereof. When implemented in software or firmware, version management system 22 can be stored in memory device 14, as illustrated, and executed by processing device 12. Alternatively, when implemented in hardware, a version management system or circuit can be implemented in processing device 12 using discrete logic circuitry, an application specific integrated circuit (ASIC), a programmable gate array (PGA), a field programmable gate array (FPGA), or any combination thereof.

Database 20 may include a limited storage capacity and can be controlled by version management system 22. Database 20 is adapted to store attribute information for one or more products. The information stored in database 20 can be managed by version management system 22 to reduce much of the redundancy of storage that conventional systems tend to experience. Therefore, version management system 22 can store and manage a reduced amount of product information data, particularly when a product undergoes several minor modifications. In addition to product information, database 20 is also configured to store a bitmap, which is defined in greater detail below. Generally, the bitmap indicates which portions of the product information in a version have been changed from a previous version. Furthermore, database 20 is configured to store, for each version, the date when the respective version is effective, referred to herein as the "effective date." In some embodiments, the effective date may correspond to the release date of the version. Database 20 may also store tables, maps, lists, snapshots, etc., as described below with respect to FIGS. 5-15, for referencing attributes, attribute groups, changes of attribute information from one version to another, reference information regarding where relevant attribute information is stored for a version in a previous version, and so on.

Version management system 22, which can be stored partially or fully in memory device 14, in addition to any other software, programs, or computer code including executable logical instructions as described herein, can be embodied in computer-readable media for execution by any suitable processing device, such as processing device 12. The computer-readable media as described herein can include one or more suitable physical media components that can store the software, programs, or computer code for a measurable length of time.

Input/output devices 16 may include input mechanisms such as keyboards, keypads, cursor control devices, or other data entry devices. The input mechanisms enable a user to enter information for modifying a version, entering effective dates, etc. Input/output devices 16 also include output devices, which may be computer monitors, audio output devices, printers, or other peripheral devices for communicating information to the user.

Figure 2:
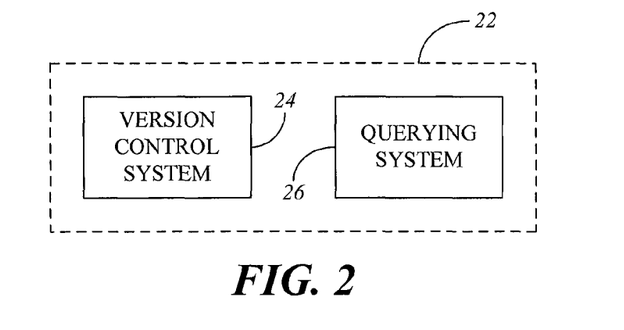
FIG. 2 is a block diagram illustrating the version management system shown in FIG. 1 according to one embodiment.

FIG. 2 is a block diagram of an embodiment of version management system 22 shown in FIG. 1. In this embodiment, version management system 22 includes a version control system 24 and a querying system 26. In general, version control system 24 is configured to manage the insertion and/or cancellation of versions. Also, version control system 24 is able to update and purge versions as necessary. Using version control system 24, a user can create a draft of a version. If necessary, the draft may go through an approval process before it is released as a version. Version control system 24 is configured to insert the version after the latest version or, in some embodiments, can insert it between two previously entered versions. An intermediate insertion can be made by setting a future effective date between the effective dates of two consecutive versions. Generally, inserted versions apply only to future effective dates, which help to preserve the history of the version data.

Version control system 24 is also configured to determine and map the attributes and attribute groups that are changed from a previous version. Based on the portions that are changed from one version to another, version control system 24 can control the storage of newly changed information and can also map references back to previous versions that contain attributes that are not changed in the modified version. When previous versions contain the latest information for some attributes, a reference map referring back to these versions can be used to retrieve the information in order to complete an entire snapshot of the version information when needed. These and other functions of version control system 24 are described in more detail below with respect to FIGS. 3 and 4.

Querying system 26 is configured to allow a user to query or search for data in database 20 based on the management scheme established by version management system 22. At the time that a query is made, querying system 26 determines which version is effective based on the version having the most recent effective date with respect to a queried date. Since each version includes a different start for its effective date and may also include a time period during which the version is effective, each version is effective from its effective date until the effective date of the chronologically next version or during its effective time period, depending on the particular design. A query made at a later time may fall within a time range of a version with a later effective date. In some embodiments, querying system 26 can use reference information, such as a reference table or map, to determine which previous versions, if any, a version in question refers to with regard to relevant data. Querying system 26 may include or access any suitable search engine for retrieving relevant data with respect to one or more versions. After retrieving information from both the current version and the previous versions upon which the current version relies, querying system 26 can piece together the information to create a complete snapshot of the relevant data for the current version.

Querying system 26 allows the user to perform the snapshot creation operation with a single query. The version reference table and the actual product data tables storing the versioned data can be joined. A sample query may include the following:

---

Select * from product_data_tables pdt, version_reference_table vrt
    where (version_id == < version ID for which
    we are querying>
or  (not exists (Select 1 from product_data_tables pdt1 where
        pdt1.version_id== <version ID for which we are
        querying> and pdt1.attribute_group_id=<attribute
        group id which we are querying> and
        pdt1.extension_id=pdt.extension_id)
    and   pdt.version_id=vrt.source_version_id and
        pdt.attribute_group_id=vrt.attribute_group_id
    and   vrt.version_id= <version ID for which we are
    querying>))
    and   vrt.attribute_group_id= <attribute group id which
    we are querying>

---

Figure 3:
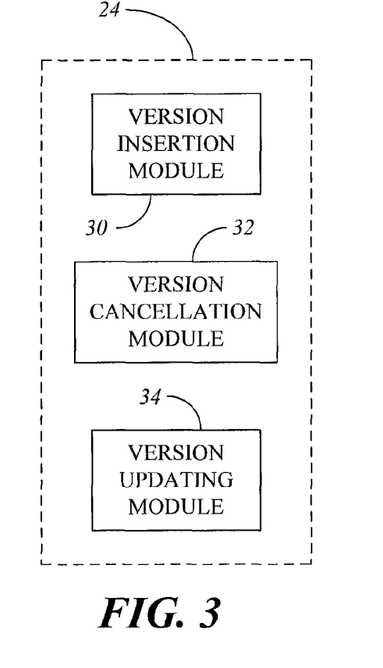
FIG. 3 is a block diagram illustrating the version control system shown in FIG. 2 according to one embodiment.

FIG. 3 is a block diagram of an embodiment of version control system 24 shown in FIG. 2. In this embodiment, version control system 24 includes a version insertion module 30, a version cancellation module 32, and an version updating module 34. As mentioned above, modified product information of new versions can be stored in database 20. Version insertion module 30 is configured to store all the information for an initial version, from which other versions can reference as necessary. Also, any versions inserted before this initial version can be considered to be a base version. A complete snapshot including all the product information can also be stored for this base version as well. A version can also be inserted as the latest version with the latest effective date or it can be inserted intermediately between two consecutive versions.

Version insertion module 30 handles the creation of new versions and allows the modification of information with respect to previous versions. Based on the modifications, version insertion module 30 can create bitmaps defining which portions of the version have changed from the previous version and can create reference information for retrieving relevant information stored with respect to previous versions for those attributes and attribute groups that are not changed. When a version is inserted intermediately between two existing versions, version updating module 34 can update the versions proceeding the inserted version to include the modified information as needed.

Version cancellation module 32 is configured to enable a user to cancel a version. If a version to be cancelled is the latest version based on the effective date, then the version can be cancelled without affecting the other versions. However, any cancelled version can be archived so that it can still be referenced. If a version to be cancelled is not the latest version, then version cancellation module 32 can instruct version updating module 34 to update the other versions that reference the cancelled version. The impact that a cancelled version originally held for the future versions is negated or removed. Specifically, any new data introduced by the cancelled version that trickles down to later versions will revert to the data that existed before the cancelled version. Therefore, while an intermediate version is being cancelled by version cancellation module 32, version updating module 34 can retrieve the data that was replaced by the version to be cancelled and insert this data in the versions that reference this information.

A purging process can be performed on one or more versions based on the history of the effective dates of the versions and the passing of time. When old versions become obsolete, a new version can be referred to as the base version. Version updating module 34 completes the data in the new base version by copying the data from the older versions, as necessary. Version updating module 34 also updates the references for future versions to refer to the base version when necessary instead of the versions to be purged or moved into another storage. At the time of purge, version updating module 34 identifies the version that would be the lowest available version after the purge. This version would be the next higher version from the highest version being purged. Version updating module 34 moves the relevant data to this version.

Version updating module 34 is configured to update the versions that are effected by insertions and cancellations. When a version having an effective date earlier than at least one other version is either inserted or cancelled, the versions having a later effective date are updated as necessary by version updating module 34. Versions that refer to prior information, which is modified by an intermediately inserted version, are modified accordingly by version updating module 34 to reference the modified information in the inserted version. Also, versions that reference the attribute information contained in a version to be cancelled are modified by version updating module 34 to instead reference the prior information of a previous version before the information was modified by the version to be cancelled.

Version updating module 34 is further configured to maintain a table or map describing how versions reference other versions having earlier effective dates. One example of such a table is illustrated and described with respect to FIG. 14. For the information that is not changed by a particular version, version updating module 34 maps back to previous versions allowing the relevant information to be retrieved when needed. The reference information makes references to the previous versions that a version relies for which the relevant data is stored. Since unchanged attribute groups are not stored in a current version, the current version references the previous versions in order to be able to retrieve the relevant data that is stored with respect to the earlier versions.

Version updating module 34 is also configured to create a complete snapshot of a version when it is released. Version updating module 34 uses the reference information describing how a new effective version relies on previous version(s). The referenced attributes are retrieved from the previous versions and stored in conjunction with the new effective version. In this way, the current version attribute group data row can be completed to form an entire snapshot of the product information data and later versions can reference this version if necessary. This causes the new effective version to be the new base version having all the attribute information for this particular attribute group row to future versions. However, the bitmap still helps to identify the attributes that are being changed in the current version. From this base version, the future versions can also be updated by version updating module 34 to reference the base version instead of an earlier outdated version.

After the new effective version is updated and made the base version, version updating module 34 can purge the outdated versions having an effective date that is earlier than the effective date of the new effective version after copying the complete data set to the new base version based on the version reference data. Therefore, if the new effective version having a valid effective date follows one or more versions having earlier effective dates that have already passed, these prior versions can be purged. Alternatively, rather than purging these outdated versions, version updating module 34 may instead back up these versions into inexpensive storage components. Therefore, version updating module 34 can purge or back up these prior versions, if needed, in order to make additional storage space available in database 20.

Version updating module 34 can also be used when a version that is not necessarily the effective version is queried by the user. In this case, version updating module 34 retrieves the relevant information from earlier versions and this snapshot of the queried version can then be presented to the user.

Figure 4:
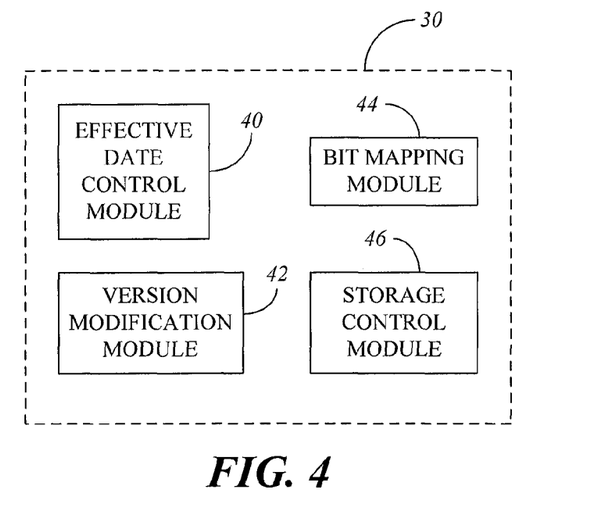
FIG. 4 is a block diagram illustrating the version insertion module shown in FIG. 3 according to one embodiment.

FIG. 4 is a block diagram of an embodiment of version insertion module 30 shown in FIG. 3. According to this embodiment, version insertion module 30 includes an effective date control module 40, a version modification module 42, a bit mapping module 44, and a storage control module 46. The modules shown in FIG. 4 may work together as one unit and may simply represent certain interdependent functions of version insertion module 30. In some embodiments, some or all of these modules can be incorporated within version cancellation module 32 and/or version updating module 34 as would be understood by one of ordinary skill in the art. Storage control module 46, for example, can be used to control how versions and related data are stored and when the versions and related data are altered.

Effective date control module 40 is configured to enable a user to enter an effective date for a newly created version. As suggested above, the effective date represents a date in the future when that version becomes effective or is to be released. This version will then remain effective until an effective date of another version is reached. If two versions are given the same effective dates, effective date control module 40 can inform the user of this fact. Another conflict that may arise with the entering of an effective date is the entry of a date in the past. In this case, effective date control module 40 may indicate this error to the user. If the user enters a valid effective date that is between the dates of two consecutive versions, then effective date control module 40 can inform version updating module 34 of the existence of a new version inserted intermediately. On release of this version, version updating module 34 can update reference information for the affected versions. Effective date control module 40 can also be used to change the planned effective date of a draft version if necessary. When the planned effective date is changed, the data is re-queried and snapshots are reconstituted to reflect the change in the previous version being referenced.

When a user is in the process of drafting a version to be approved, an implementation date may be left blank until the version is actually approved. The "implementation data," not to be confused with the effective date, is the date on which a version or draft is released for production. In some cases, the implementation date can be the date on which a version is approved and its status changed to "released." The trickling up effect would not take place until after the version is approved. Also, when a version is being cancelled, the implementation date is removed as well. In the case where the version being cancelled is not the highest version, when a trickle down effect would be triggered by trickling the approved version prior to the version being cancelled.

It can be possible to identify whether the absence of the implementation date is due to a cancelled version or represents an unapproved version requiring approval. For example, this issue can be resolved by considering the implementation date and version approval status together. Particularly, only one version can have a given implementation date and the specific version spans over a time period. As an example, if version 4.0 is given an effective time period of, say, October 10th to October 20th, then no other version can be approved within these same dates. However, time periods can be adjusted to allow an inserted version. For example, if two versions were be inserted after version 4.00, the time periods could be planned so that the start dates are different and the time periods do not overlap. A new version 4.50, for instance, might be scheduled to start on October 15 and version 4.75, for instance, might be scheduled to start on October 17. With this insertion, version 4.0 would run October 10-14, version 4.50 would run October 15-16, and version 4.75 would run October 17-20. Regarding the cancellation of version, if version 4.50 were cancelled, for example, then the time period for version 4.00 would be adjusted to run October 10-16.

Version modification module 42 is configured to enable a user to select one or more attribute groups in which a modification of data is being made from a previous version. Based on which attribute group or groups are selected, version modification module 42 can retrieve the respective attributes of each attribute group to allow the user to make modifications as needed. When one or more attribute groups are changed, version modification module 42 can store the modified information in the database 20 and inform version updating module 34 and bit mapping module 44, as needed, that the respective attribute groups have been changed.

Referring again to FIG. 3, version updating module 34 is further described with respect to the function of trickling up the version data. In this respect, version updating module 34 can use the bitmaps of the effected and source triggering version when a version is inserted intermediately. For example, if a version 2.5 is inserted between version 2.0 and 3.0, then trickle up would involve applying the changed attributes from version 2.5, if the same attributes remain unchanged in version 3.0. To identify the changed attributes from version 2.5 that remain unchanged in version 3.0, the respective bitmaps can be used.

Version updating module 34 may include the following logic to reevaluate the reference information referring back to previous versions:

The cancelled version needs to trickle up attribute group data to versions above. In this example, the "current_version" and "version ID" correspond to the version being cancelled.

```
{
    query attribute groups with sourceversionid as the versionid
    for each attributegroup in attribute groups
        attributegroup.sourceversionid =
        current_versionid.sourceversionid//
            (for the corresponding attribute groups) {
                boolean changed =
                fixrowsnapshot(attributegroup.versionid)
                if (changed)
                    trickleup(attributegroup.versionid)
            }
}
```

Version updating module 34 may also include the following logic to correct reference to versions, in the case of version insertion, by trickling up attribute group data to versions above, if any:

```
{
    query the attribute groups for the current row
    query the next higher version
    for each attributegroup in attribute groups updated by current
    version
        change all higher version's source version for those
            attribute groups to the current version if source
            version effective date < current version effective
            date
    trickleup(versionid)
}
```

For version cancellations, all references to the current version will be replaced by the current version's source version and run "fixrowsnapshot" to correct the snapshot based on the new source version. To fix a snapshot of a row, the following logic may be used: fixrowsnapshot(versionid)

```
fixrowsnapshot(versionid)
{
    count of attributes copied = 0
        for all attributes not in the bitset see if attribute value is different from the
            paramsourceversionid value;
            if (different) set the value and increment count of attributes copied;
        if (attributes copied count>0) return true
}
```

To trickle up the reference version information, the following logic may be used:

```
trickleup(paramsourceversionid)
{
    query all attribute group source row with sourceversionid as the
        paramsourceversionid value for all attribute group source row;
    of (fixrowsnapshot(attribute group source row.versionid)) trickleup(attribute group
        source row,versionid)
}
```

Bit mapping module 44 is configured to store a record of which attributes of a plurality of attributes of a modified attribute group were changed and which attributes were not changed. In one implementation, a zero "0" can be used to indicate that an attribute is not changed and a one "1" can be used to indicate that an attribute is changed. Bit mapping module 44 can apply ones and zeros to a bitmap showing which of the attributes are changed. The length of the bitmap is indicative of the number of attributes associated with a particular attribute group. The attribute groups can include any number of attributes. In one example, for instance, suppose that an attribute group is being changed. Also suppose that the attribute group has eight different attributes, where each attribute includes a specific value or description. Given that attributes 1, 2, 5, 7, and 8 are changed, then the bitmap associated with this attribute group would be 11001011. The bitmap therefore defines which attributes are changed and which ones are the same as previous versions and reference these previous versions when retrieving the information is needed.

For a draft version, which includes data that can be edited and an effective date that can be altered, delta rows with only the changed attributes can be stored. In this scenario, the bitmaps allow bit mapping module 44 to handle the elimination of a value from a previous version, since the bitmap indicates the modification information of the eliminated attribute. Bitmaps can also help to identify whether any changes have occurred as part of a current row and can help the user choose whether to allow the data of the current version to remain or to refer to the previous version. Thus, the user can avoid data be stored redundantly. When the version released, the entire snapshot remains and the bitmap serves to identify data that was modified with the current version during the trickling up of the data.

Bit mapping module 44 may include any suitable logic for creating a bitmap. In some embodiments, the logic may include:

```
for (int i=0; i<ATTR_COUNT; i++)
        {
                bitmap=bitmap.add(bitmap);
                    if (attributechangedlist.get(i))
                    {
                        bitmap=bitmap.add(one);
                    }
        }
Also, bitmap to bitset conversion logic may include:
        for (int i=0; mitmap.compareto(one)!=
        && i<ATTR_COUNT; i++) {
                result=bitmap.divideandremainder(two);
                bitmap=result[0];
                if (result[1].compareto(zero)!=0{
                        system.out.print(1);
                        attributechangedlist.set(ATTR_COUNT-i-1);
                } else system.out.print(0);
        }
```

Figure 5:
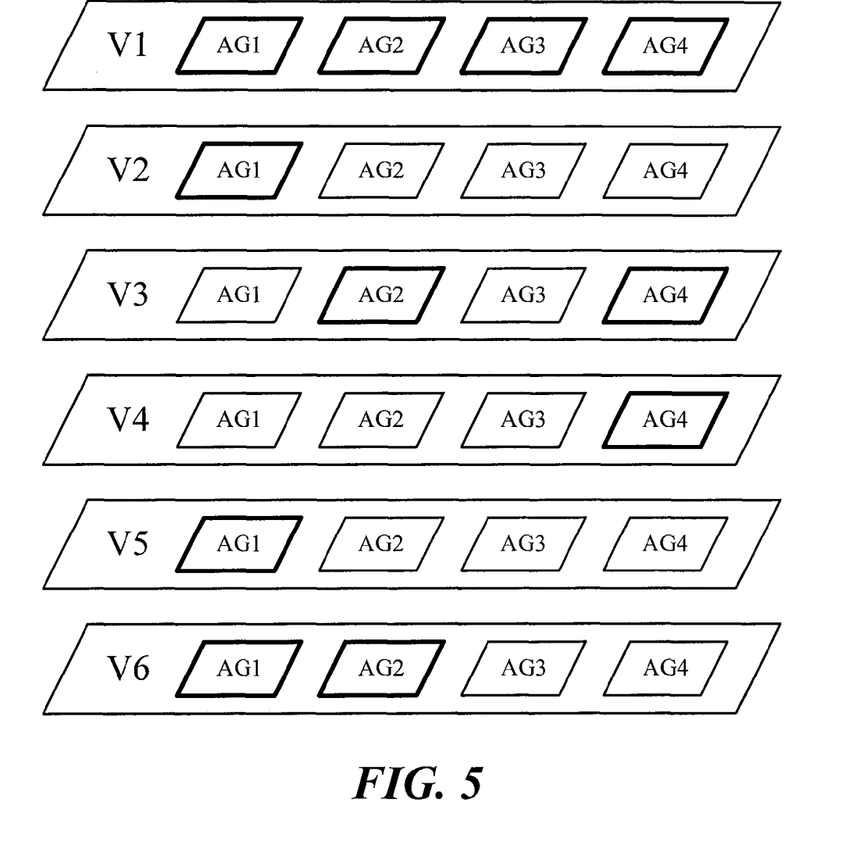
FIG. 5 is a diagram illustrating an example of attribute groups for a number of versions according to one embodiment.

FIG. 5 is a diagram illustrating an embodiment of a number of versions, where each version includes a plurality of attribute groups (AGs). The highlighted AGs represent the AGs that are modified from a prior version and are stored in the respective version. Those AGs which are not highlighted are not stored but refer to past versions. Although FIG. 5 illustrates an example of six versions V1, V2, V3, V4, V5, and V6, it should be noted that any number of versions may be prepared for the respective product information. And although FIG. 5 illustrates that each version include four attribute groups with internal names AG1, AG2, AG3, and AG4, it should also be noted that each version can include any suitable number of attribute groups. In some embodiments, the attribute groups can be user-defined. Although not shown in FIG. 5, each attribute group may include any number of attributes less than a maximum limit, e.g., 100, of user-defined attributes predefined for the implementation. If one attribute group represents "size," for example, the attributes within that attribute group may include length, width, height, etc. Each attribute will include a value or some other descriptive information.

Some products can be defined by the same number of attributes, based on the type of product it is. Also, each version for a given product may have the same number of attribute groups and the same types of attributes. The example shown in FIG. 5 illustrates that the first version V1 includes the four attribute groups AG1, AG2, AG3, and AG4, where each of the attribute groups is highlighted to emphasize that the information in each of the attribute groups is new. In this respect, V1 is the initial or base version. In the second version V2, according to this example, only the first attribute group AG1 is highlighted, indicating that only this attribute group has been changed from the previous version. Therefore, according to the teaching of the present disclosure, AG2, AG3, and AG4 are not stored for V2, thereby reducing the data stored in database 20. Instead, to retrieve these attribute groups, reference can be made back to V1, which stores the data for AG2, AG3, and AG4.

In the third version V3, attribute groups AG2 and AG4 are changed from the previous version V2 and are highlighted in this figure to indicate this change. Thus, AG1 and AG3 in version V3 are not stored, but can be retrieved from previous versions. Namely, AG1 can be retrieved from V2, which, from the point of view of V3, includes the latest changes of AG1. Also, AG3 can be retrieved from V1 since AG3 was not changed in version V2. Likewise, V4, V5, and V6 include changes to one or more attribute groups as shown.

Figure 6:
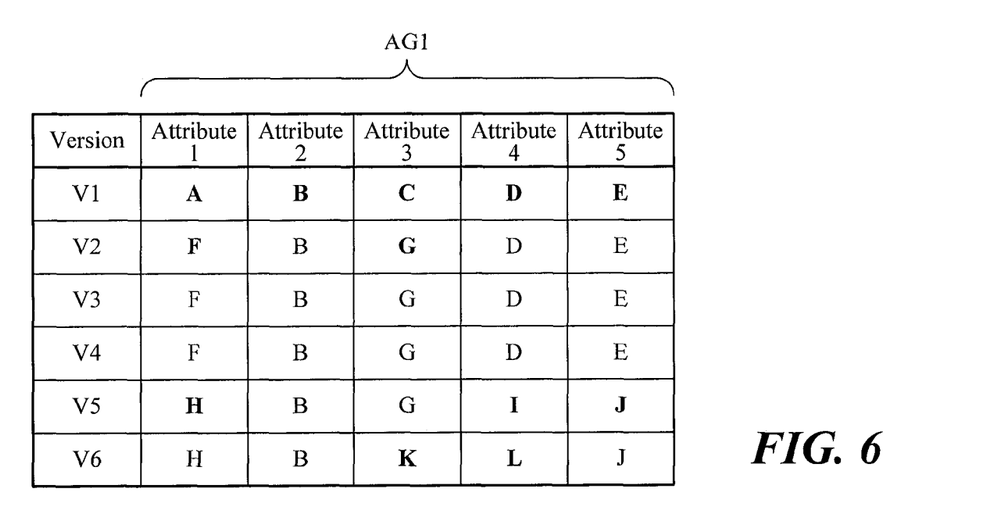
FIG. 6 is a table illustrating an example of attribute information of a specific attribute group shown in FIG. 5, the table showing the changes of the attribute data over the versions shown in FIG. 5, according to one embodiment.

FIG. 6 is a diagram illustrating an embodiment of a table, which includes attribute information for a specific attribute group, i.e., AG1, and changes of the attribute information over the versions shown in FIG. 5. The highlighted AGs are the ones that were modified in the respective versions. The rest can be copied from the reference version in the case of released versions or can be referred from the reference version data in the case of drafted versions. Each attribute is internally represented, for example, by characters A, B, C, D, E, F, G, H, I, J, K, and L. FIG. 6 also illustrates how attribute information is trickled down to later versions when no changes are made for the respective attributes. Also, it should be noted that FIG. 5 shows in this example that attribute group AG1 is not modified in versions V3 and V4. Therefore, this implies that the attributes of AG1 in this versions likewise do not change. This can be seen in FIG. 6 where V3 and V4 repeat the same values—F, B, G, D, and E—for Attribute 1, Attribute 2, Attribute 3, Attribute 4, and Attribute 5, respectively.

The variables A through L may represent one or more values for the particular attribute, depending on the specific application. This table shows the latest relevant data for each attribute group and shows the changed, or new, data in bold. For example, since the first version V1 includes all new data, each attribute of AG1 is highlighted by illustrating the variables A, B, C, D, and E in bold. In version V2, AG1 is modified, as indicated by the highlighting in FIG. 5. More particularly, FIG. 6 shows which attributes of AG1 are changed in version V2. For instance, the data or value A for Attribute 1 is replaced by data or value F. Also, new data or value G replaces data or value C for Attribute 3. These characters, F and G, are highlighted to show that they include new data, but B, D, and E are not highlighted to indicate that reference to the relevant data for these attributes is trickled down from previous version(s), i.e., V1 in this case.

Versions V3 and V4 are not changed and therefore refer back to the data stored with respect to previous versions. Versions V5 and V6 show other examples of one or more modified attributes and one or more unchanged attributes that reference back to the trickled down attributes from previous versions.

Figure 7A:
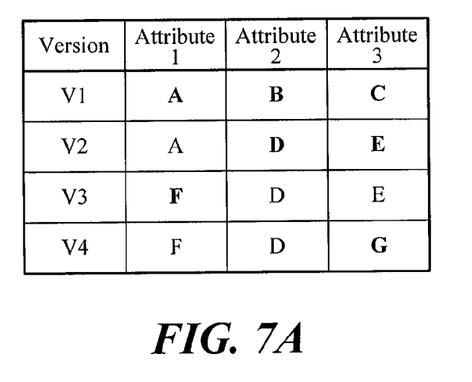
FIGS. 7A and 7B are tables of attribute information illustrating a process, according to one embodiment, for updating the remaining versions when a version is cancelled.
Figure 7B:
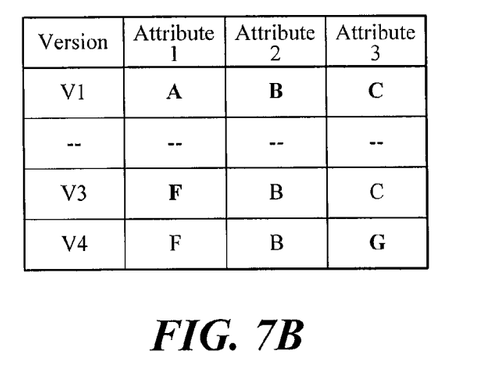

FIGS. 7A and 7B are diagrams of a table showing an example of a version cancellation process for a given attribute group. When a version is cancelled, version updating module 34 (FIG. 3) can be used to update the remaining versions. Particularly, FIG. 7A shows a table having four versions, where each version includes three attributes—Attribute 1, Attribute 2, and Attribute 3. The attributes are associated with a certain attribute group. In this example, the attribute group is modified by each version and one or more attributes are illustrated as being modified at each version.

FIG. 7B illustrates the use of version cancellation module 32 (FIG. 3) to perform a cancellation process to cancel one of the versions. In this example, version V2 is being cancelled. Originally, as shown in FIG. 7A, version V2 included new value sets D and E for attributes Attribute 2 and Attribute 3, respectively. When this version is cancelled, the D and E value sets that were originally trickled down at least to version V3 are no longer valid. Therefore, the versions after V2, i.e., V3 and V4 in this case, are updated to retrieve the relevant information from one or more previous versions, i.e., V1. Version updating module 34 modifies the reference information to refer back to V1. Particularly, the value sets B and C for Attribute 2 and Attribute 3, respectively, are restored from V1 for version V3. Also, the value set B is trickled down to V4 as well.

Figure 8A:
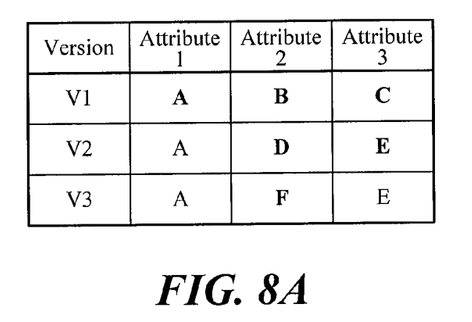
FIGS. 8A and 8B are tables of attribute information illustrating a process, according to one embodiment, for updating the remaining versions when a version is inserted intermediately.
Figure 8B:
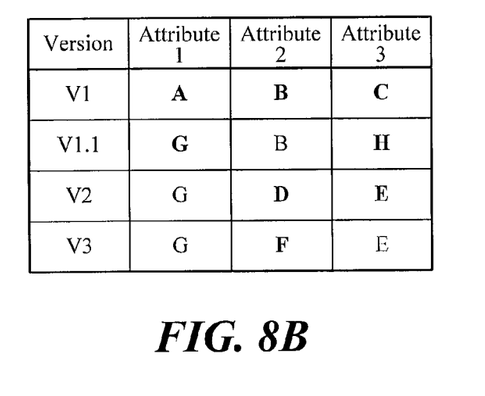

FIGS. 8A and 8B are diagrams of tables showing an example of a version insertion process, where the insertion is made intermediately between two existing versions. When a version is inserted, version updating module 34 can be used to update the versions following the newly inserted version. In this specific example, FIG. 8A shows a table having three versions V1, V2, and V3. Also, FIG. 8A shows a sample attribute group having three attributes Attribute 1, Attribute 2, and Attribute 3. FIG. 8B illustrates a case where the user utilizes version insertion module 30 (FIG. 3) to insert new version V1.1 between previously existing versions V1 and V2. At this point in time, between the effective time periods of V1 and V2, version V1.1 includes changes to two attributes Attribute 1 and Attribute 3, where Attribute 1 is given the new value set G and Attribute 3 is given the new value set H. Originally, version V2 referenced V1 regarding Attribute 1 having a value set of A, as shown in FIG. 8A. However, with version V1.1 inserted, V2 is updated to include value set G from version V1.1, as shown in FIG. 8B.

Figure 9:
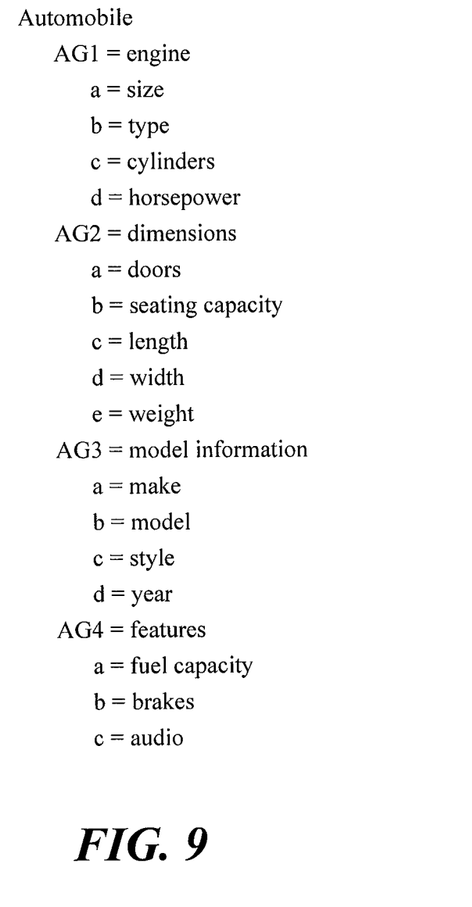
FIG. 9 is a diagram illustrating a list of attribute groups and corresponding attributes for a first product according to one embodiment.

FIG. 9 is a diagram illustrating a list of attribute groups AG1, AG2, AG3, and AG4 for a first product, i.e., an automobile. AG1, AG2, AG3, and AG4 are internal names for the attribute groups and the characters a, b, c, and d, described below, are internal names for various attributes. It should be noted that the product and corresponding attribute groups can be any type of product and any attribute groups depending on the particular product. In this simplified example, the automobile can be described using four attribute groups AG1, AG2, AG3, and AG4, representing the groups "engine," "dimensions," "model information," and "features," respectively. AG1 (engine) contains the attributes "size," "type," "cylinders," and "horsepower." AG2 (dimensions) contains the attributes "doors," "seating capacity," "length," "width," and "weight." AG3 (model information) contains the attributes "make," "model," "style," and "year." AG4 (features) contains the attributes "fuel capacity," "brakes," and "audio". Of course, for a product that is as complex as an automobile, many more attribute groups and attributes will likely be included in the list. Thus, FIG. 9 may represent a simplified example for such a product.

Figure 10:
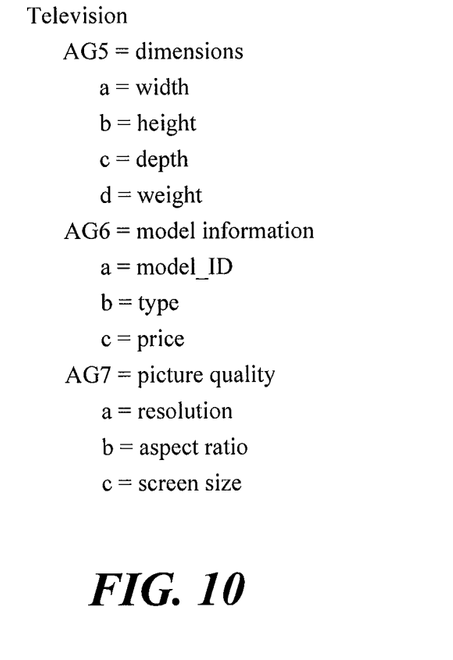
FIG. 10 is a diagram illustrating a list of attribute groups and corresponding attributes for a second product according to another embodiment.

FIG. 10 is a diagram illustrating a list of attribute groups AG5, AG6, and AG7 for a second product, i.e., a television. AG5, AG6, and AG7 are examples of internal names for the attribute groups. In this example, which is simplified for the sake of brevity, the television is described using three attribute groups AG5, AG6, and AG7, representing the groups "dimensions," "model information," and "picture quality," respectively. AG5 (dimensions) contains the attributes "width," "height," "depth," and "weight." AG6 (model information) contains the attributes "model_ID," "type," and "price." AG7 (picture quality) contains the attributes "resolution," "aspect ratio," and "screen size."

The setup of attribute groups can be done in any suitable manner, such as an item class level, where item class to item is similar to a class to object scenario in a object oriented programming language. For example, for an item class of "mobile devices," the items may include, for example, Nokia 2210, Nokia N90, etc. For all mobile phones, the same set of attribute groups define the attributes, which can be setup at the item class. For each item, values for the attributes can be defined for these attribute groups. The variables "a," "b," and "c" in FIGS. 9 and 10 are internal names that correspond to table columns in the attribute group database row to which each attribute is stored. This technique may be used by storage control module 46 for referring to the attribute data. To the user, however, the data is displayed as "width," "height," etc.

Figure 11:
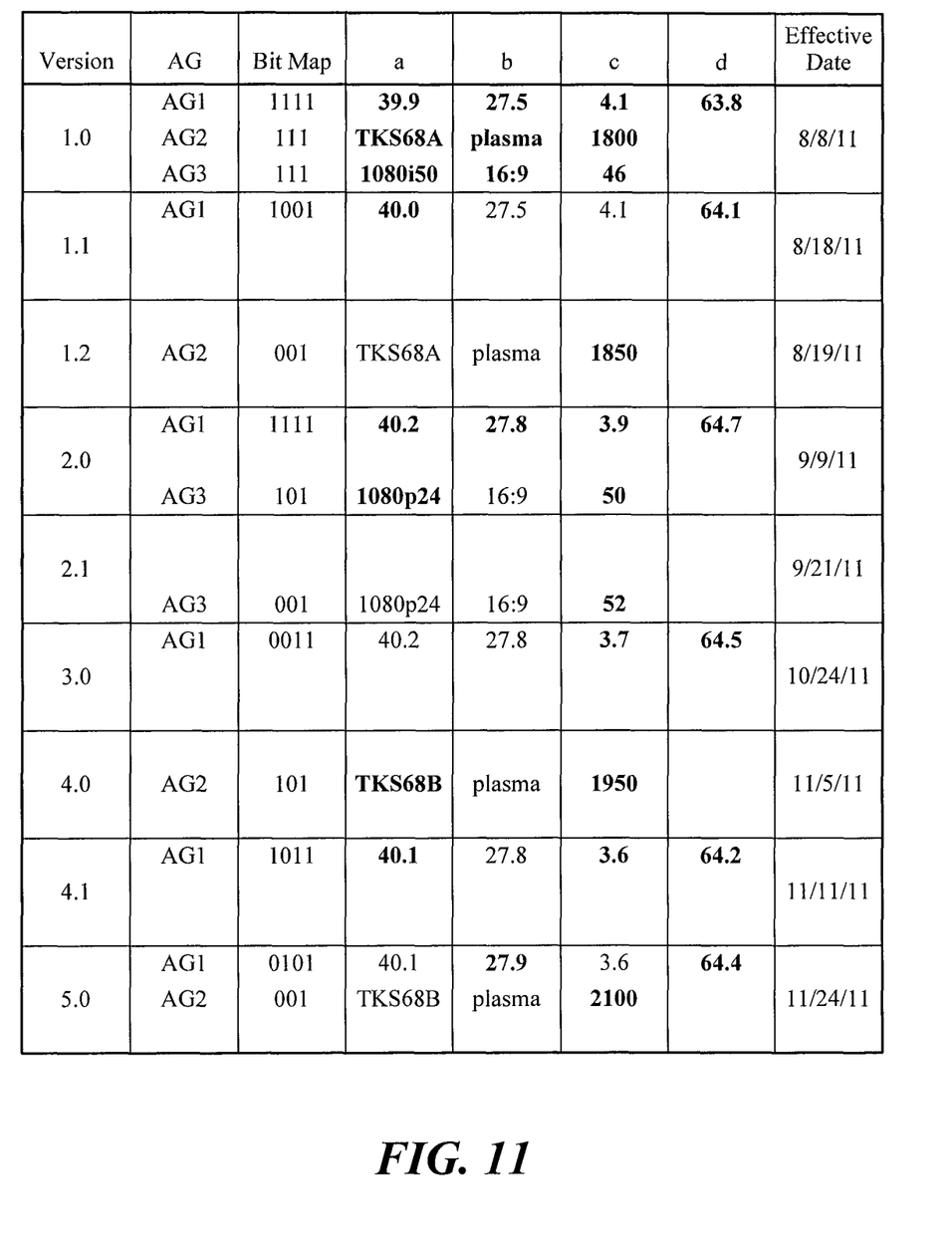
FIG. 11 is a diagram illustrating an example of modifications of attribute groups and attributes of a number of versions for the second product described with respect to FIG. 10, according to one embodiment.

FIG. 11 is a diagram illustrating an embodiment of a table including product information with respect to the example product "television" shown in FIG. 10. In the embodiment of FIG. 11, the table includes a version number, attribute groups, bit map information, a first attribute "a", a second attribute "b", a third attribute "c", a fourth attribute "d" (if applicable to the respective attribute group), and effective date information. This example shows that nine versions 1.0, 1.1, 1.2, 2.0, 2.1, 3.0, 4.0, 4.1, and 5.0 have been created. The version numbers as illustrated are somewhat arbitrary and more particularly can be defined by the user using any suitable version nomenclature technique. Since the product in this example, i.e., television, includes three attribute groups, the AG column shows the attribute groups that were initially entered for version 1.0 and the attributes that were modified thereafter in the following versions. Each version contains the modification of at least one attribute group.

If an attribute group is indicated as being modified, yet the bitmap column includes all zeros, indicating no changes, then version updating module 34 may choose not to store such an attribute group row in database 20. As mentioned above, instead of purging, the versions that are no longer needed for immediate retrieval may alternatively be backed up into a storage means.

In version 1.0 of the example of FIG. 11, AG1 (dimension) includes attributes a, b, c, and d, respectively representing width, height, depth, and weight. Particularly, the product, i.e., television, in this example is originally designed with a width of 39.9 inches, a height of 27.5 inches, a depth of 4.1 inches, and weight of 63.8 pounds. With respect to the second attribute group AG2 (model information), the product includes a "model_ID" of TKS68A, its "type" is plasma, and its price is $1800. With respect to AG3 (picture quality) for version 1.0, the "resolution" is 1080i50, its "aspect ratio" is 16:9, and its "screen size" is 46 inches. All of these attributes are stored as a complete snapshot for the original first version 1.0. It should be noted that the units of measure mentioned herein may be included in the table or defined in the description of the attributes, such as in the list of FIG. 10.

The bitmap column shows the changes of the respective attributes of specific attribute groups for the various versions. Changes made with respect to version 1.0 are stored as version 1.1. Particularly, only attribute group AG1 is changed in version 1.1. Bitmap shows 1001, indicating that the first and fourth attributes of AG1 are changed from version 1.0. As shown, the first attribute "a" (width) is changed to 39.9 inches to 40.0 inches and the fourth attribute "d" (weight) is changed from 63.8 pounds to 64.1 pounds. Since attributes b and c and attribute groups AG2 and AG3 are not changed in version 1.1, these attributes and attribute groups are not saved. However, reference can be made back to version 1.0 to retrieve the relevant data. In version 1.2, the only modified attribute group is AG2 and the only modified attribute, as indicated by bitmap value 001, is the third attribute representing price. In this example, the price is changed from $1800 to $1850. Regarding the next versions, other changes are made to various attribute groups and attributes as shown.

The last column of the table of FIG. 11 includes the effective dates of the versions. Using effective date control module 40 (FIG. 4), the user can enter any date in the future for a version to be inserted. Based on where this date falls with respect to the other versions, the version can be placed between two existing versions if necessary. For example, suppose that versions 1.0 and 2.0 shown in FIG. 11 were entered first and were set with effective dates of 8/8/11 and 9/9/11, respectively. And suppose that intermediate versions to be named versions 1.1 and 1.2 were to be inserted between these versions, where AG1 was to be changed in version 1.1 and AG2 was to be changed in version 1.2. In this case, version 1.1 might be given an effective date between the dates of versions 1.0 and 2.0 and version 1.2 might be given an effective date after version 1.1 but before version 2.0. Furthermore, with these versions inserted between versions 1.0 and 2.0, version 2.0 would be changed by version updating module 34 to reference the attributes modified by versions 1.1 and 1.2, since these modification will be trickled down through the versions as needed.

Figure 12:
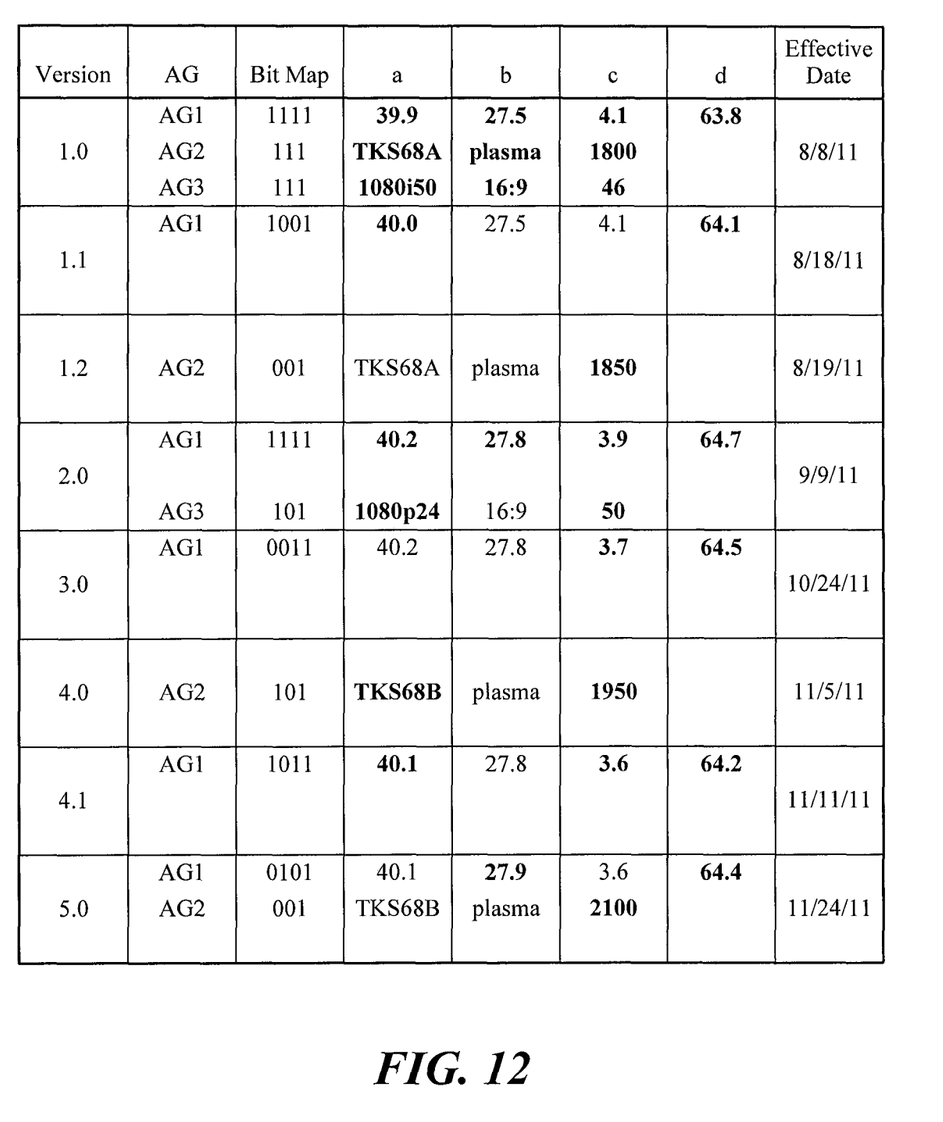
FIG. 12 is a diagram illustrating an example of the modifications of attribute groups and attributes shown in FIG. 11 with a version cancelled, according to one embodiment.

FIG. 12 is a diagram illustrating an embodiment of the table shown in FIG. 11. Particularly, the table includes product information with respect to the example product "television" shown in FIG. 10. Similar to FIG. 11, the table in this embodiment includes a version number, attribute groups, bit map information, a first attribute "a", a second attribute "b", a third attribute "c", a fourth attribute "d" (if applicable to the respective attribute group), and effective date information. However, in this example, the version 2.1 shown in FIG. 11 has been canceled and removed from the table. With the removal of version 2.1, eight versions 1.0, 1.1, 1.2, 2.0, 3.0, 4.0, 4.1, and 5.0 remain. The effects of the data in a version that is cancelled are negated by removing that data from later versions that reference this data. Thus, the later versions can be modified as needed to correct any invalid data due to the cancellation of a version.

Figure 13:
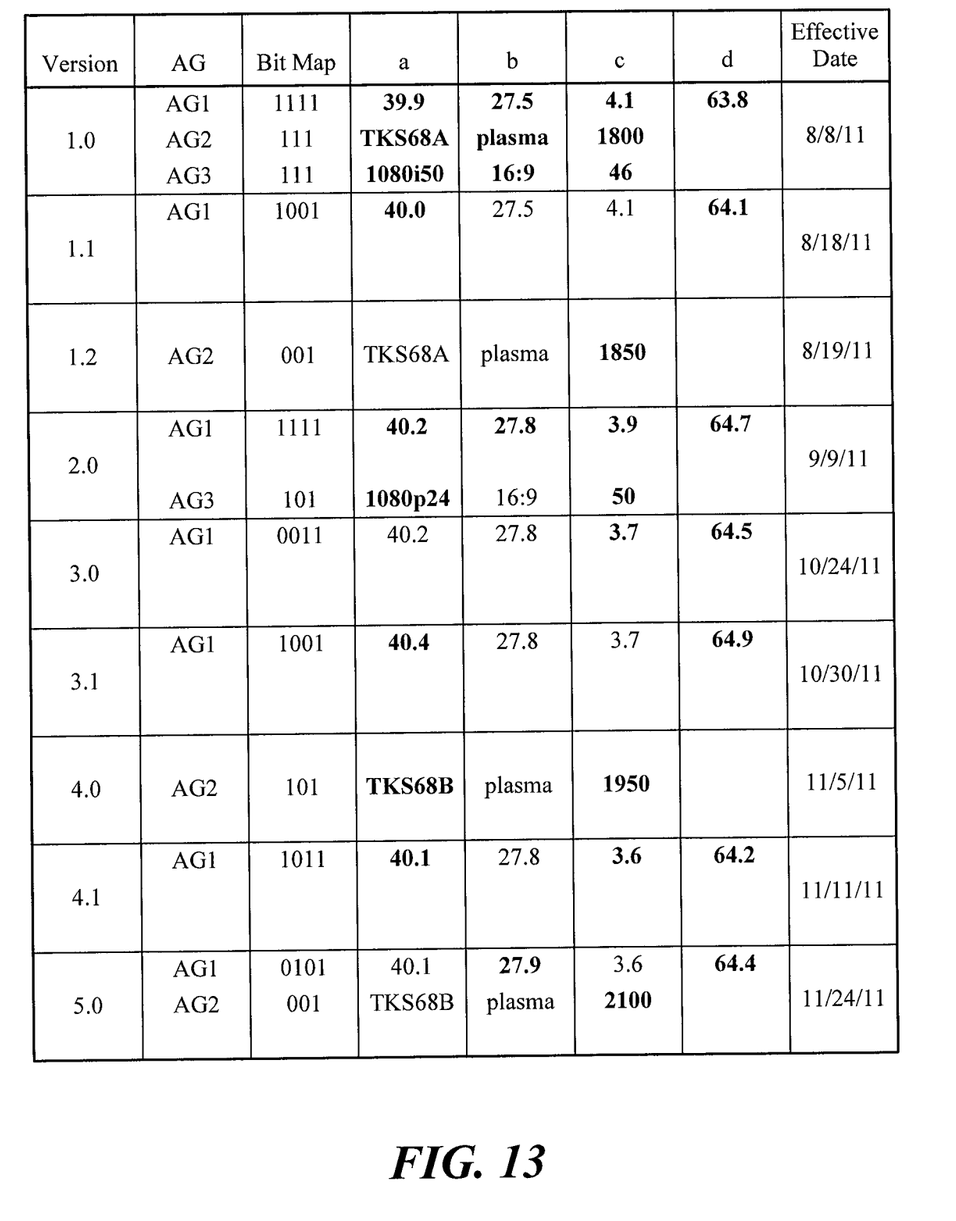
FIG. 13 is a diagram illustrating an example of the modifications of attribute groups and attributes shown in FIGS. 11-12 with a version inserted intermediately, according to one embodiment.

FIG. 13 is a diagram illustrating an embodiment of the table shown in FIGS. 11-12. More particularly, the table shows product information with respect to the example product "television" shown in FIG. 10. Similar to FIGS. 11 and 12, the table in this embodiment includes a version number, attribute groups, bit map information, a first attribute "a", a second attribute "b", a third attribute "c", a fourth attribute "d" (if applicable to the respective attribute group), and effective date information. This example shows the addition of a new version 3.1 inserted between versions 3.0 and 4.0, resulting in a total of nine versions 1.0, 1.1, 1.2, 2.0, 3.0, 3.1, 4.0, 4.1, and 5.0. The data of an inserted version is trickled down through the later versions as necessary. Thus, the later versions can be updated as needed to include the new information due to the insertion of version V3.1.

Figure 14:
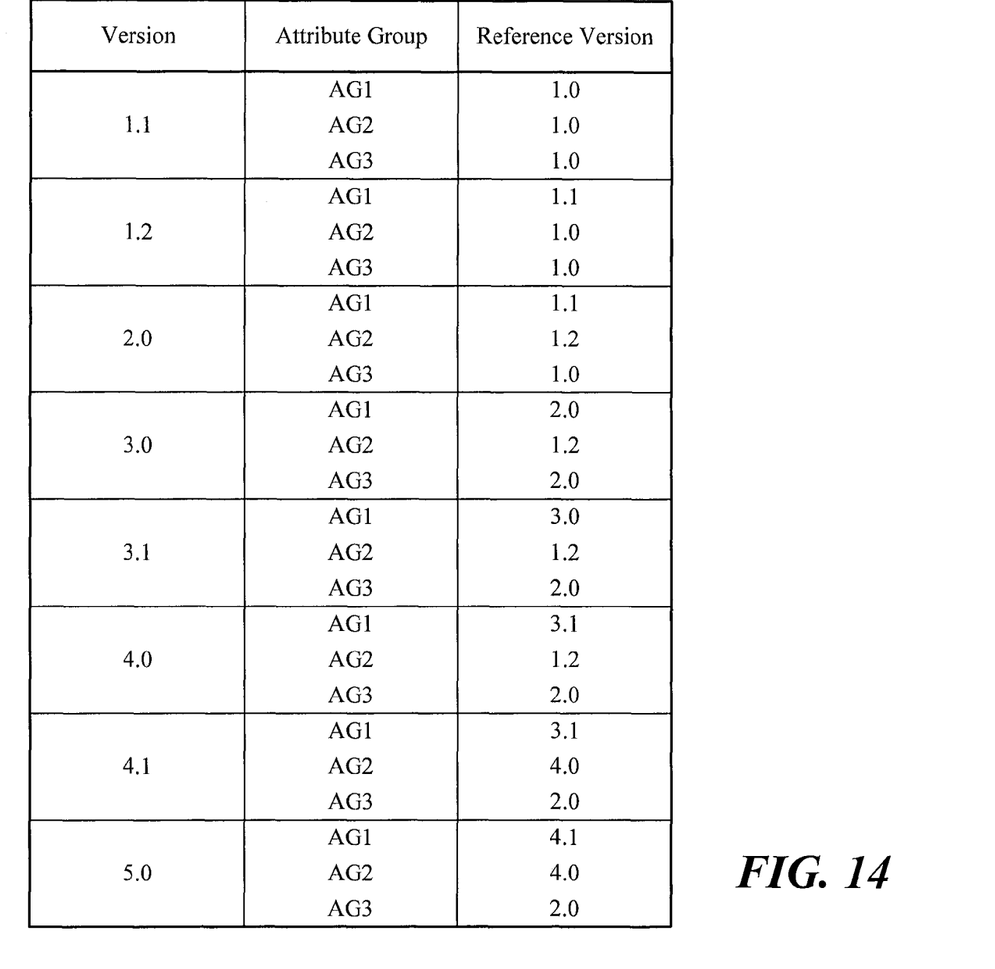
FIG. 14 is a diagram illustrating an example of a table of reference information based on the modifications of the attribute groups described with respect to FIGS. 11-13, according to one embodiment.

FIG. 14 is a diagram illustrating an embodiment of a table showing reference information. This table is an example of the relevant reference information for the embodiment of FIGS. 10-13, which describe the product information for the television product. The reference information refers back to the particular version or versions that contain the relevant data that a version relies on when it is created or inserted. For example, when version 4.0 is created, the attribute group AG1 originally referred back to version 3.0. However, with the insertion of version 3.1, which contains the latest updated data for the attribute group AG1 as demonstrated with respect to FIG. 13, version 4.0 refers back to the newly added version 3.1, inserted intermediately between versions 3.0 and 4.0, as described above with respect to FIG. 13.

For attribute group AG2, version 4.0 refers back to version 1.2, which includes the latest data for this attribute group. While creating version 4.0, the changes made to AG2 can be compared with version 1.2 to determine the proper bitmap (FIG. 11) based on the modified attributes of AG2. For example, the first attribute of AG2, i.e., model_ID, is changed to "TKS68B" and the third attribute, i.e., price, is changed to $1950. The second attribute "type" is not changed and remains "plasma," which is illustrated as being the same in both version 1.2 and 4.0.

Attribute group AG3 of version 4.0 originally referred back to version 2.1. However, when version 2.1 was cancelled, the reference information for version 4.0 (and other versions) was altered to reflect the cancellation. Specifically, upon cancellation of version 2.1, version 4.0 refers back to version 2.0, which includes the latest data for this attribute group. Since only AG2 is modified in version 4.0, the next version (version 4.1) refers back to the same versions that 4.0 refers back to except for AG2, which is modified in version 4.0. This table can be stored and referenced when versions are inserted or cancelled to determine where information can be retrieved when needed.

Figure 15:
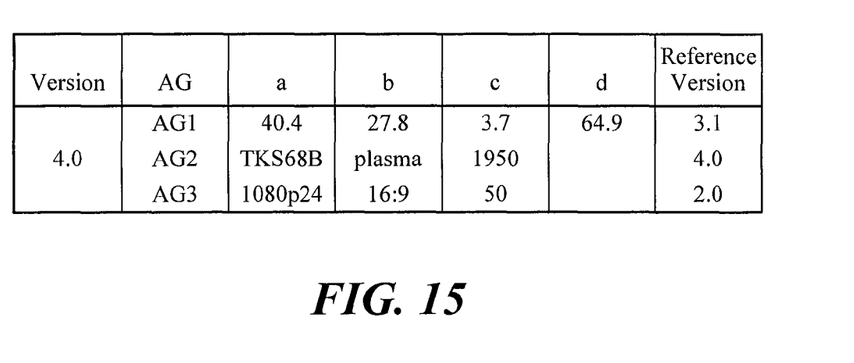
FIG. 15 is a diagram illustrating an example of a snapshot of the attribute information of one version associated with FIGS. 11-14, according to one embodiment.

FIG. 15 is a table illustrating an example of the snapshot information for one version related to the product described in FIGS. 10-14. In this figure, the snapshot is shown for version 4.0. The attribute groups AG1, AG2, and AG3 are shown along with the respect attribute information a, b, c, and d for each attribute group. Since AG2 and AG3 only include three attributes a, b, and c, the "d" attribute is left blank. The values or descriptive data for the attributes is also shown in the drawing. In addition, the reference version column, or source version column, shows the source of where the relevant information is stored. For example, AG1 information is stored with respect to version 3.1, AG2 information is stored with respect to itself (version 4.0), and AG3 information is stored with respect to version 2.0. The data in this table is retrieved to form the snapshot of version 4.0 when needed.

It should be understood that the steps, processes, or operations described herein may represent any module or code sequence that can be implemented in software or firmware. In this regard, these modules and code sequences can include commands or instructions for executing specific logical steps, processes, or operations within physical components. It should further be understood that one or more of the steps, processes, and/or operations described herein may be executed substantially simultaneously or in a different order than explicitly described, as would be understood by one of ordinary skill in the art.

The embodiments described herein represent a number of implementations and examples and are not intended to necessarily limit the present disclosure to any specific embodiments. Instead, various modifications can be made to these embodiments as would be understood by one of ordinary skill in the art. Any such modifications are intended to be included within the spirit and scope of the present disclosure and protected by the following claims.

We claim:

1. A product information versioning system comprising:
a processor; and
a memory, coupled to the processor, storing a database including:
 a product information table including information describing a product as different versions, a first version including a version number, an effective date, and a plurality of attribute groups, a first attribute group including a name, a plurality of attribute data values and a bit map defining which attribute data values have changed from a previous version, and
 a reference information table including, for the first version, a reference version number for the first attribute group, the reference version number indicating the previous version containing the previous attribute data values for the first attribute group,
wherein the memory stores instructions that, when executed by the processor, control product versioning, comprising:
 modifying one or more attribute data values within the first attribute group in the first version in the product information table,
 creating a bitmap for the modified first attribute group, the bitmap including one bit for each attribute data value in the modified first attribute group, each bit indicating whether the respective attribute data value has changed or whether the respective attribute data value has not changed,
 creating a new entry for a second version in the product information table, including:
  for each bit in the bitmap indicating that the respective attribute data value has changed, storing the modified attribute data value in a first attribute group in the second version, and
  for each bit in the bitmap indicating that the respective attribute data value has not changed, storing the unmodified attribute data value in the first attribute group in the second version, and
 creating a new entry for the second version in the reference information table, including:
  storing the version number of the first version as the reference version number of the first attribute group in the second version, and
  storing the reference version number of an unmodified attribute group in the first version as the reference version number of the unmodified attribute group in the second version.

2. The product information versioning system of claim 1, further comprising input/output devices, coupled to the processor, configured to communicate information between a user and the product information versioning system.

3. The product information versioning system of claim 1, wherein the instructions that control product versioning further comprise canceling one or more existing versions.

4. The product information versioning system of claim 1, wherein the instructions that control product versioning further comprise querying the database to retrieve relevant product information associated with a version.

5. The product information versioning system of claim 1, wherein the instructions that control product versioning further comprise automatically purging outdated versions having an effective date prior to an effective date of a currently effective version, and updating the currently effective version with at least a portion of the information contained in the purged versions.

6. A database management system, comprising:
a processor; and
a memory, coupled to the processor, storing a database including:
 a product information table including information describing a product as different versions, a first version including a version number, an effective date, and a plurality of attribute groups, a first attribute group including a name, a plurality of attribute data values and a bit map defining which attribute data values have changed from a previous version, and
 a reference information table including, for the first version, a reference version number for the first attribute group, the reference version number indicating the previous version containing the previous attribute data values for the first attribute group,
wherein the memory stores instructions that, when executed by the processor, manage the database, comprising:
inserting a new version of product information into the database, including:
 modifying one or more attribute data values within the first attribute group in the first version in the product information table,
 creating a bitmap for the modified first attribute group, the bitmap including one bit for each attribute data value in the modified first attribute group, each bit indicating whether the respective attribute data value has changed or whether the respective attribute data value has not changed,
 creating a new entry for a second version in the product information table, including:
  for each bit in the bitmap indicating that the respective attribute data value has changed, storing the modified attribute data value in a first attribute group in the second version, and
  for each bit in the bitmap indicating that the respective attribute data value has not changed, storing the unmodified attribute data value in the first attribute group in the second new version, and
 creating a new entry for the second version in the reference information table, including:
  storing the version number of the first version as the reference version number of the first attribute group in the second version, and
  storing the reference version number of an unmodified attribute group in the first version as the reference version number of the unmodified attribute croup in the second version, and
 searching the database based on the effective dates of the versions.

7. The database management system of claim 6, wherein the managing further comprises determining a valid version based on the most recent effective date with respect to a current date.

8. The database management system of claim 7, wherein the managing further comprises purging versions having an effective date prior to an effective date of the valid version.

9. The database management system of claim 8, wherein the managing further comprises updating the remaining versions by retrieving product information stored in association with the purged versions and storing the product information in association with the remaining versions.

10. The database management system of claim 6, wherein the managing further comprises canceling one or more existing versions.

11. A computer-based version control method, comprising:
storing a database in a memory, the database including:
a product information table including information describing a product as different versions, a first version including a version number, an effective date, and a plurality of attribute groups, a first attribute group including a name, a plurality of attribute data values and a bit map defining which attribute data values have changed from a previous version, and
a reference information table including, for the first version, a reference version number for the first attribute group, the reference version number indicating the previous version containing the previous attribute data values for the first attribute group;
inserting a new version of product information into the database, including:
entering an effective date associated with the inserted version to establish when the inserted version becomes effective,
modifying one or more attribute groups within the first attribute group in the first version in the product information table,
creating a bitmap for each modified attribute group, the bitmap including one bit for each attribute data value in the modified first attribute group, each bit indicating whether the respective attribute data value has changed with respect to the attribute data value of the previous version or whether the respective attribute data value has not changed,
creating a new entry for a second version in the product information table, including:
for each bit in the bitmap indicating that the respective attribute data value has changed, storing the modified attribute data value in a first attribute group in the second version, and
for each bit in the bitmap indicating that the respective attribute data value has not changed, storing the unmodified attribute data value in the first attribute group in the second new version, and
creating a new entry for the second version in the reference information table, including:
storing the version number of the first version as the reference version number of the first attribute group in the second version, and
storing the reference version number of an unmodified attribute group in the first version as the reference version number of the unmodified attribute group in the second version; and
searching the database based on the effective dates of the versions.

12. The version control system of claim 11, further comprising canceling a version.

13. The version control system of claim 12, wherein canceling a version includes modifying a reference to one or more prior versions when the reference is made to a version to be cancelled.

14. The version control system of claim 13, further comprising updating one or more versions when a version is inserted or cancelled.

15. The version control system of claim 14, wherein updating one or more versions includes purging outdated versions and update versions that reference the purged versions.

16. A non-transitory computer readable medium storing instructions that, when executed by a processor, manage a database, the instructions comprising:
storing a database in a memory, the database including:
a product information table including information describing a product as different versions, a first version including a version number, an effective date, and a plurality of attribute groups, a first attribute group including a name, a plurality of attribute data values and a bit map defining which attribute data values have changed from a previous version, and
a reference information table including, for the first version, a reference version number for the first attribute group, the reference version number indicating the previous version containing the previous attribute data values for the first attribute group;
inserting a new version of product information into the database, including:
entering an effective date associated with the inserted version to establish when the inserted version becomes effective, modifying one or more attribute groups within the first attribute group in the first version in the product information table,
creating a bitmap for each modified attribute group, the bitmap including one bit for each attribute data value in the modified first attribute group, each bit indicating whether the respective attribute data value has changed with respect to the attribute data value of the previous version or whether the respective attribute data value has not changed,
creating a new entry for a second version in the product information table, including:
for each bit in the bitmap indicating that the respective attribute data value has changed, storing the modified attribute data value in a first attribute group in the second version, and
for each bit in the bitmap indicating that the respective attribute data value has not changed, storing the unmodified attribute data value in the first attribute group in the second new version, and
creating a new entry for the second version in the reference information table, including:
storing the version number of the first version as the reference version number of the first attribute group in the second version, and
storing the reference version number of an unmodified attribute group in the first version as the reference version number of the unmodified attribute group in the second version; and
searching the database based on the effective dates of the versions.

17. The non-transitory computer readable medium of claim 16, wherein the instructions further comprise determining a valid version based on the most recent effective date with respect to a current date.

18. The database management system of claim 17, wherein the instructions further comprise purging versions having an effective date prior to an effective date of the valid version.

19. The database management system of claim 18, wherein the instructions further comprise updating the remaining versions by retrieving product information stored in association with the purged versions and storing the product information in association with the remaining versions.

20. The database management system of claim 16, wherein the instructions further comprise canceling one or more existing versions.

* * * * *